United States Patent
Hurwitz et al.

(10) Patent No.: US 7,549,396 B2
(45) Date of Patent: Jun. 23, 2009

(54) BREAKABLE ACTIVE ODOR CONTROL ADDITIVE FOR ANIMAL LITTER

(75) Inventors: Marni Markell Hurwitz, Far Hills, NJ (US); Dave Narasimhan, Flemington, NJ (US); Ernest D. Buff, Far Hills, NJ (US)

(73) Assignee: I DID IT, Inc., Far Hills, NJ (US)

( * ) Notice: Subject to any disclaimer, the term of this patent is extended or adjusted under 35 U.S.C. 154(b) by 649 days.

(21) Appl. No.: 11/408,493

(22) Filed: Apr. 21, 2006

(65) Prior Publication Data

US 2007/0181071 A1 Aug. 9, 2007

Related U.S. Application Data

(63) Continuation-in-part of application No. 11/348,723, filed on Feb. 7, 2006.

(51) Int. Cl.
*A01K 29/00* (2006.01)
(52) U.S. Cl. .................................................. 119/171
(58) Field of Classification Search ......... 119/171–173; 424/76.6
See application file for complete search history.

(56) References Cited

U.S. PATENT DOCUMENTS

| | | | | | |
|---|---|---|---|---|---|
| 2,649,759 | A | * | 8/1953 | Gibbs | 119/173 |
| 3,675,625 | A | | 7/1972 | Miller et al. | 119/173 |
| 3,855,125 | A | * | 12/1974 | Lin | 210/714 |
| 4,129,094 | A | | 12/1978 | Stockel | 119/173 |
| 4,203,388 | A | | 5/1980 | Cortigene et al. | 119/172 |
| 4,296,234 | A | * | 10/1981 | Mindt et al. | 536/47 |
| 4,405,354 | A | | 9/1983 | Thomas, II et al. | 71/21 |
| 4,459,368 | A | | 7/1984 | Jaffee et al. | 502/80 |
| 4,494,482 | A | | 1/1985 | Arnold | 119/173 |
| 4,517,919 | A | | 5/1985 | Benjamin et al. | 119/173 |
| 5,094,190 | A | | 3/1992 | Ratcliff et al. | 119/173 |
| 5,097,799 | A | | 3/1992 | Heitfeld et al. | 119/172 |
| 5,183,655 | A | | 2/1993 | Stanislowski et al. | 424/76.6 |
| 5,329,880 | A | | 7/1994 | Pattengill et al. | 119/171 |
| 5,634,431 | A | | 6/1997 | Reddy et al. | 119/173 |
| 5,680,830 | A | * | 10/1997 | Kawaguchi et al. | 119/172 |
| 5,806,462 | A | | 9/1998 | Parr | 119/173 |
| 5,975,019 | A | | 11/1999 | Goss et al. | 119/173 |
| 5,992,351 | A | | 11/1999 | Jenkins | 119/173 |
| 6,015,550 | A | | 1/2000 | Marquis | 424/76.1 |
| 6,206,947 | B1 | | 3/2001 | Evans et al. | 71/63 |
| 6,207,143 | B1 | * | 3/2001 | Lezdey et al. | 424/76.6 |

(Continued)

*Primary Examiner*—Kimberly S Smith
(74) *Attorney, Agent, or Firm*—Ernest D. Buff & Associates, LLC; Ernest D. Buff; Dave Narasimhan

(57) ABSTRACT

A breakable odor control additive provides release of fragrance or odor masking scent when present in a litter formulation that is used by a cat or other animal within a litter box. The odor control additive comprises a plurality of fragrant-scented balls. Each of the balls has a central, compressible, porous, open-celled substrate, which is saturated with a fragrant scent. This central, fragrance-saturated substrate is coated with a barrier coating comprising soda ash, which prevents evaporation of the fragrance and protects the substrate against deterioration by urine and other contaminants deposited on the litter when cat or animal enters the litter box, a load is applied to the fragrant-scented balls. The barrier coating breaks, exposing the fragrant coated substrate, while the soda ash neutralizes urine acid and retards odor development fragrance evaporating from the substrate provides odor control and a pleasant scent.

22 Claims, 2 Drawing Sheets

U.S. PATENT DOCUMENTS

| | | | |
|---|---|---|---|
| 6,253,710 B1 | 7/2001 | Ward et al. | 119/171 |
| 6,667,030 B1 * | 12/2003 | Schneider | 424/76.1 |
| 6,689,714 B2 * | 2/2004 | Wheelock et al. | 502/400 |
| 6,702,951 B2 | 3/2004 | Shultz | 252/8.91 |
| 6,718,914 B2 * | 4/2004 | Riddles | 119/651 |
| 6,743,420 B2 | 6/2004 | Schneider | 424/76.1 |
| 7,183,249 B2 * | 2/2007 | Dente | 510/519 |
| 7,343,874 B2 * | 3/2008 | DeLeeuw et al. | 119/171 |
| 2004/0079293 A1 * | 4/2004 | Rasner et al. | 119/172 |

* cited by examiner

BREAKABLE ACTIVE ODOR CONTROL ADDITIVE FOR ANIMAL LITTER

CROSS-REFERENCE TO RELATED APPLICATIONS

This application is a continuation-in-part of U.S. application Ser. No.: 11/348,723, filed Feb. 7, 2006.

BACKGROUND OF THE INVENTION

1. Field of the Invention

The present invention relates to additives for animal litter; and more particularly to an additive for cat litter, which releases an odor controlling or odor masking substance when the animal uses a litter-box, and retards the odiferous compound formation.

2. Description of the Prior Art

Many patents disclose methods for control of odor in animal litter. When animal litter is not of a clumping variety, it is difficult to control the odor since the urine excreted is absorbed over a much larger distance. Clumps are created when the composition of the swells during the absorption of pet urine, creating a localized rigid clump. Typical additives for litter which provide this swelling and urine absorption property include gypsum, calcium sulfate hemi-hydrate which absorbs water, forming $CaSO_4.2H_2O$, swelling Kaolin or montmorillonite clays. Gums of different variety are also used to dissolve and form a bond, creating clumps. Odor control is generally achieved by adding ingredients to the litter that either mask the odor or add compounds that are anti-bacterial, or other compounds that exhibit pleasant smell. The urine odor is created by the formation of amine containing compounds produced by decomposition of urine and by urine decomposing gram-positive bacteria.

U.S. Pat. No. 3,675,625 to Miller et al. teaches a litter which is "activated" by heating and then contacted with an odor control agent, such as pine oil, citrus oil, camphor or the like.

U.S. Pat. No. 4,129,094 to Stockel discloses the use of fly ash, bottom ash and/or boiler slag as cat litter materials. The composition of fly ash, as determined by the ASTM includes silicon dioxide, alumina, ferric oxide, calcium oxide, magnesium oxide, sodium oxide and potassium oxide. This is a complex chemically reacted composition and absorbs urine but does not eliminate the odor.

U.S. Pat. No. 4,203,388 to Cortigene et al. teaches the use of a deodorant such as sodium bicarbonate, in amounts of between about 1% and about 10% of the dry weight of the litter. Such large amounts of deodorizer are necessitated since the litter itself is also used as an absorbent for urine, requiring the deodorizer to be homogeneously dispersed throughout the particles of the litter.

U.S. Pat. No. 4,405,354 to Thomas et al. discloses the use of buffering agents to prevent gaseous ammonia from escaping into the air. However, such buffering agents serve only to prevent the formation of gaseous ammonia; they are ineffective against other unpleasant odors. Further, the amounts of such agents range from about 0.5% to about 25% by weight, since all of the absorbent litter must be treated with the agent to provide sufficient contact with the urine.

U.S. Pat. No. 4,459,368 to Jaffee, et al. discloses particulate sorbing and deodorizing mixtures containing synthetic and clay sorbents. The composition contains sorbent fuller's earth clay particles and sorbent synthetic particles, e.g. calcium sulfate dihydrate-containing granules, in a weight ratio of about 0.5:9.5 to about 4:6, respectively. This combination of clay minerals and calcium sulfate dihydrate does not provide odor control.

U.S. Pat. No. 4,494,482 to Arnold discloses an animal litter composition. This solid absorbent material has about 25 ppm to about 500 ppm of a halogenated aromatic hydrocarbon bacteriostat that effectively prevents the development of urine odors. The bacteriostat is selected from the group consisting of p-chloro-m-cresol; hexachlorophane, 2,4,4'-trichloro-2'-hydroxydiphenyl ether, trichlorocarbanilide, 2,4-dichloro-m-xylenol, 3,4,5-tribromosalicylanilide, 3,5,3',4'-tetrachlorosalicylanilide or 3,5,3',5'-tetrachlorodiphenyl sulfide. These chlorinated or brominated compounds kill odor-producing bacteria.

U.S. Pat. No. 4,517,919 to Benjamin et al. discloses the use of undecylenic acid in amounts from about 1000 to about 10,000 ppm and a bacteriostat in amounts from about 25 to 500 ppm. U.S. Pat. No. 5,094,190 to Ratcliff et al. teaches an odor control animal litter to which a boron-containing liquid material has been applied.

U.S. Pat. No. 5,097,799 discloses odor control agents selected from the group consisting of guanidine salts, alkali metal fluorides, alkali metal bisulfites, and mixtures thereof. These agents are applied to the litter using an aqueous dispersion to produce an odor control animal litter.

U.S. Pat. No. 5,183,655 teaches an odor control animal litter that has applied to it an effective amount of pine oil in combination with an effective amount of boric acid.

U.S. Pat. No. 5,329,880 to Pattengill, et al. discloses clumpable animal litter. This waterproof litter contains a mixture of non-smectitic, hydrophilic shale aggregate with a fraction of coarse material with a size less than about 5 mesh (4000 microns). The mixture has the property of agglomerating into a clump upon contact with urine. The agglomerated clump of shale and urine is removable with a perforated scoop. The shale may contain up to 10 weight percent clumping agent selected from the group of water absorbent polymers, corn starch, gelatin, gluten and dried plants of the Plantago family. In addition 5 to 25 wt % ammonia absorbing zeolite may be added for odor control. The odor control agent is an absorbent for ammonia and does not provide odor control since ammonia is not immediately formed.

U.S. Pat. No. 5,634,431 to Reddy, et al. discloses odor inhibiting pet litter. The addition of urease negative bacteria to sodium smectite clay minerals in pet litter inhibits growth of urease positive bacteria for a period of several days, thereby retarding formation of ammonia and other obnoxious odors. Approximately fifty percent sodium bentonite in the litter causes the litter to clump upon wetting, maintaining the urea in contact with the treated clay and also serving as a buffer to favor growth of the urease negative bacteria. This composition entirely relies on inhibiting ammonia formation and does not provide immediately a pleasant scent.

U.S. Pat. No. 5,806,462 to Parr discloses clumping animal litter. The animal litter, is particularly for cats and has a gelatin solution and a dry adhesive sprayed onto the granules. The gelatin solution provides enough dampening to adhere the adhesive particles to the clay particles. Because the gelatin sets quickly, it does not provide so much wetting as to activate the adhesive. Therefore, the adhesive retains its adhesive properties and, together with the gelatin, causes the litter to clump when wetted by an animal. This clumping cat litter formulation provides no odor control.

U.S. Pat. No. 5,975,019 to Goss, et al. discloses clumping animal litter. The clumping animal litter utilizes the interparticle interaction of a sodium bentonite swelling clay with a non-swelling clay material. Preferably, sixty percent (60%)

by weight, or less, composition of sodium bentonite is used after the judicious selection of particle size distribution such that the mean particle size of the non-swelling clay material is greater than the mean particle size of the sodium bentonite. In addition, an organic clumping agent, such as a pregelatinized corn starch can be combined with the sodium bentonite/clay mixture to enhance clumping properties. This clumping clay litter does not control odor.

U.S. Pat. No. 5,992,351 to Jenkins discloses clumpable animal litter with improved odor control. The clumpable animal litter with improved odor control comprises a) water-swellable clay particles capable of adhering other such particles upon contact with moisture; and b) an odor controlling-effective amount of a boron compound of a composition di-alkali metal tetraborate n-hydrate, wherein n is 4, 5 or 10, which controls odors arising from the contact of said clay particles with moisture.

U.S. Pat. No. 6,015,550 to Marquis discloses a method for controlling odor using alkylene carbonates. These alkylene carbonates are useful for reducing odor where an odoriferous amine-containing compound is present under conditions such that the alkylene carbonate forms a reaction product with odoriferous amine-containing compounds reducing the odor. Sources of such amine-containing compounds include chicken coops, dumps, land fills, cat litter, stagnant water, water treatment ponds and plants, garbage cans and dumpsters, dog kennels, zoos, rendering plants food processing plants, slaughter houses, wool plants, fish canneries (cleaning and processing plants), underground sewers, paper mills, paper processing, outhouses and toilets that have no running water, and public restrooms. The alkylene carbonate is ethylene carbonate, propylene carbonate, butylene carbonate. Propylene carbonate is a liquid at room temperature and has to be sprayed. Ethylene carbonate is a solid at room temperature and does not immediately react with the odor molecules. Therefore, it is unsuited for incorporation in a cat liter.

U.S. Pat. No. 6,206,947 to Evans, et al. discloses a process for making an animal litter comprising gypsum, aluminum sulfate and urea. The animal litter composition is an agglomerated or compacted calcined calcium sulfate absorbent. The animal litter composition is screened to a particle size between 6 mesh and about 100 mesh and an effective amount of a binder such as a clay, lignin or starch is added to the calcium sulfate to assist the calcium sulfate to pelletize. This is a gypsum composition that is agglomerated using aluminum sulfate and urea to chemically combine with gypsum. There is no odor control in this clumping litter composition.

U.S. Pat. No. 6,253,710 to Ward, et al. discloses odor control for animal litter. It uses an odor control liquid and an aerosolized composition for deodorizing and controlling the odor of animal wastes. The liquid and aerosolized composition comprises a non-aqueous volatile carrier and an odor control agent. The liquid and aerosolized composition can be applied in liquid form directly to the animal litter and/or the animal container and/or the animal waste. The litter container may be sprayed with a powdered release agent which may be talc, of talc, inorganic silicone and magnesium powders, sodium bicarbonate, chlorophyll, sodium dihydrogen phosphate, potassium acid phthalates, or their mixtures preventing the stickiness of the odor controlling liquid. The liquid mixes with the litter product and always evaporating disseminates the odor control agent and is quickly exhausted.

U.S. Pat. Nos. 6,667,030 and 6,743,420 to Schneider disclose odor control composition and process. The odor control composition eliminates household, institutional and industrial odors including cat urine odor. The odor control composition is a solution of Chloramine-T which may incorporate a suitable wetting agent. Chloramine-T describes a variety of compounds which are based on N-Sodium, N-chloro-para-toluenesulfonamide and N-Sodium, and N-Chloeo-Para-Benzenesulfonamide. This chlorine-containing compound is highly reactive and is unsuitable for use in a cat litter.

U.S. Pat. No. 6,702,951 to Shultz discloses scent adsorbing liquid formulation. This odor-absorbing liquid formulation comprises a preservative an alkali metal salt, and a particulate odor-adsorbing agent such as activated carbon. The formulation may further include an alkylaryl polyether nonionic surfactant and may have an alkaline pH. The liquid formulation is applied to apparel to be worn during hunting or observation to avoid being sensed by animals and is not included in cat litter. The alkaline pH may be advantageous in promoting penetration or coverage of the substance being treated, in retarding formation of some odiferous substances per se, and in providing an environment in which the anti-microbial preservatives are most effective in inhibiting bacterial growth and development.

There remains a need in the art for a cat or animal litter composition containing ingredients that release a pleasant scent after the cat or animal uses the litter. Also needed is a cat or animal litter composition that retards the formation of odiferous substances and eliminates the malaise odor of common litter boxes.

SUMMARY OF THE INVENTION

The present invention provides a litter formulation for a cat or animal litter having fragrance-scented balls that comprise an open-celled, porous compressible substrate. The substrate is saturated with fragrant scent and covered with a barrier layer that substantially prevents evaporation of the fragrant scent and absorption of urine and animal excrement. The barrier layer contains or covers soda ash, which is predominantly sodium carbonate neutralizing any acidity of urine and retarding odor development. When a cat or an animal enters a litter box containing the fragrance-scented balls mixed with litter, the force exerted by the cat or animal's body breaks the shell of the barrier layer. Fracture of the barrier layer exposes the compressible porous substrate, triggering release of the impregnated fragrance. This fragrance is delivered at substantially the same time as the cat or the animal disturbs the litter in the litter box, creating an environment free from unpleasant odor.

Generally stated, the fragrance-scented balls have a central core of spongy, open-celled, compressible, porous substrate that has sufficient volumetric porosity to saturate and retain impregnated scent. As used herein, the term "balls" is intended to mean spherical, cylindrical, cubical and other irregular geometric shapes. Preferably, the porous substrate is a foam made from a polymeric material such as polyurethane. The scent may be impregnated in the form of an aqueous or non-aqueous carrier, wherein the fragrance composition is dissolved. Alternatively, the pores of the compressible substrate comprise an impregnated, solid fragrance that has a fragrance vapor pressure greater than one atmosphere so that, when exposed to air, the fragrance is released as a vapor. In order to prevent the fragrance from constantly being released from the fragrant-scented balls, the surface of the fragrant-scented balls is provided with a barrier coating. The barrier coating essentially traps the liquid or fragrance vapor and prevents exhaustion of the fragrant scent. Release of the fragrance is activated only when the barrier layer is broken, for example, by the weight of a cat or animal using the litter box. The breakage of the barrier also releases soda ash, which is predominantly sodium carbonate, increasing the alkalinity in the proximity of the animal excrement. This alkalinity neutralizes any acidity present in the cat urine and retards the formation of odiferous compounds. The barrier coating also prevents the compressible porous substrate from soaking in urine or animal excrement, so that the fragrant-scented balls remain saturated with the fragrance until such a time that the barrier coating is actually broken.

The barrier coating is generally rigid and may comprise one or more components. When gypsum is used as a barrier layer, the gypsum hemi-hydrate forms a settable composition. Soda ash, which is predominantly sodium carbonate, may be mixed with gypsum hemi-hydrate to form a mixture that readily sets on the porous substrate. When this barrier layer is broken by the weight of the animal using the litter box, the sodium carbonate is released, neutralizing any acidic moieties present in the excreted urine. Moreover, the alkaline environment prevents the odor development, while the fragrance contained in the porous substrate is released. When a polymeric barrier layer is used, the porous substrate may be first coated with soda ash, which is predominantly sodium carbonate, before coating the polymeric barrier layer. The breakage of the polymeric barrier by the weight of the animal using the litter box automatically releases the sodium carbonate incorporated therein neutralizing any acid present in the urine and retarding odor development, while at the same time, releasing the fragrance contained within the porous substrate.

In a preferred embodiment, the litter used is of a clumping variety, thereby minimizing the extent of spread of urine in a liter box. The area near the clumped region is disturbed by the animal and this is precisely the area in which the scented fragrance is released. The overall litter in the litter box is generally undisturbed and the fragrant-scented balls continue to retain the fragrance, since the barrier coatings thereof are not broken.

The barrier coating is applied after the porous compressible substrate is soaked with fragrant scent. The scent may be a fragrance dissolved in an aqueous, non-aqueous carrier or dispersion of solid powder with a solid fragrance powder having a fragrance vapor pressure greater than one atmosphere. In the case of liquid compositions, the fragrance is dissolved in water, or a suitable organic solvent such as acetone, isopropyl alcohol and the like, and is saturated in the porous substrate. The barrier coating is then applied to the fragrance saturated, compressible porous substrate. The requirements for the thin barrier coating are: 1) the barrier coating should prevent the evaporation of the fragrance; 2) the barrier coating should shield the fragrant-scented ball, and prevent its interior from becoming soaked in the urine and animal excrement; and 3) the barrier coating should break under load when a cat or other animal steps into the litter box. Many barrier coatings fill this need. A number of polymeric coatings provide this functionality. Since the applied barrier coating is generally thin, having a coating thickness of 75 to 250 microns, and is placed over a compressible substrate, it breaks easily under load, thereby releasing soda ash and the fragrance saturated in the porous substrate. The barrier coating may include thermoplastic polymers dissolved in a solvent and applied as a thick syrupy solution. Evaporation of the solvent causes formation of the barrier coating. An example of polymer dissolved in a solvent is polymethyl methacarylate (PMMA) dissolved in dichloromethane. The barrier coating may be a condensation thermosetting system wherein the polymer is coated first, followed by a cross-linking agent. One example of this system is a resinous composition produced by mixing an aromatic primary amine with an aqueous emulsion containing a polymer of acrylamide and formaldehyde, as disclosed in U.S. Pat. No. 4,107,119 to Kameyama, et al. Another method of forming the barrier coating comprises the steps of dipping the fragrant scent-saturated porous compressible substrate in molten wax, and allowing the wax to solidify. Waxes used for forming a barrier coating may include whale wax, beeswax, paraffin wax and higher fatty acids such as myristic, plamitic, stearic and behenic acids, and esters thereof. Another barrier coating method comprises the steps of coating the fragrant scent-saturated porous compressible substrate with a mixture of gypsum in water and hardening the gypsum coating by hydration. This method results in a ceramic like shell, which readily cracks when a cat or other animal enters the litter box.

The odor control agent in the fragrant scent balls may be lauryl methacrylate (sold under trade name METAZENE by Pestco Company), dissolved in acetone, a non-aqueous volatile carrier. Fragrance used to saturate the substrate may include natural fragrance extracted from plant materials, fragrances chemically synthesized to imitate natural fragrances or synthetic fragrances.

BRIEF DESCRIPTION OF THE DRAWINGS

The invention will be more fully understood and further advantages will become apparent when reference is had to the following detailed description of the preferred embodiments of the invention and the accompanying drawing, in which.

DETAILED DESCRIPTION OF THE INVENTION

Figure 1:
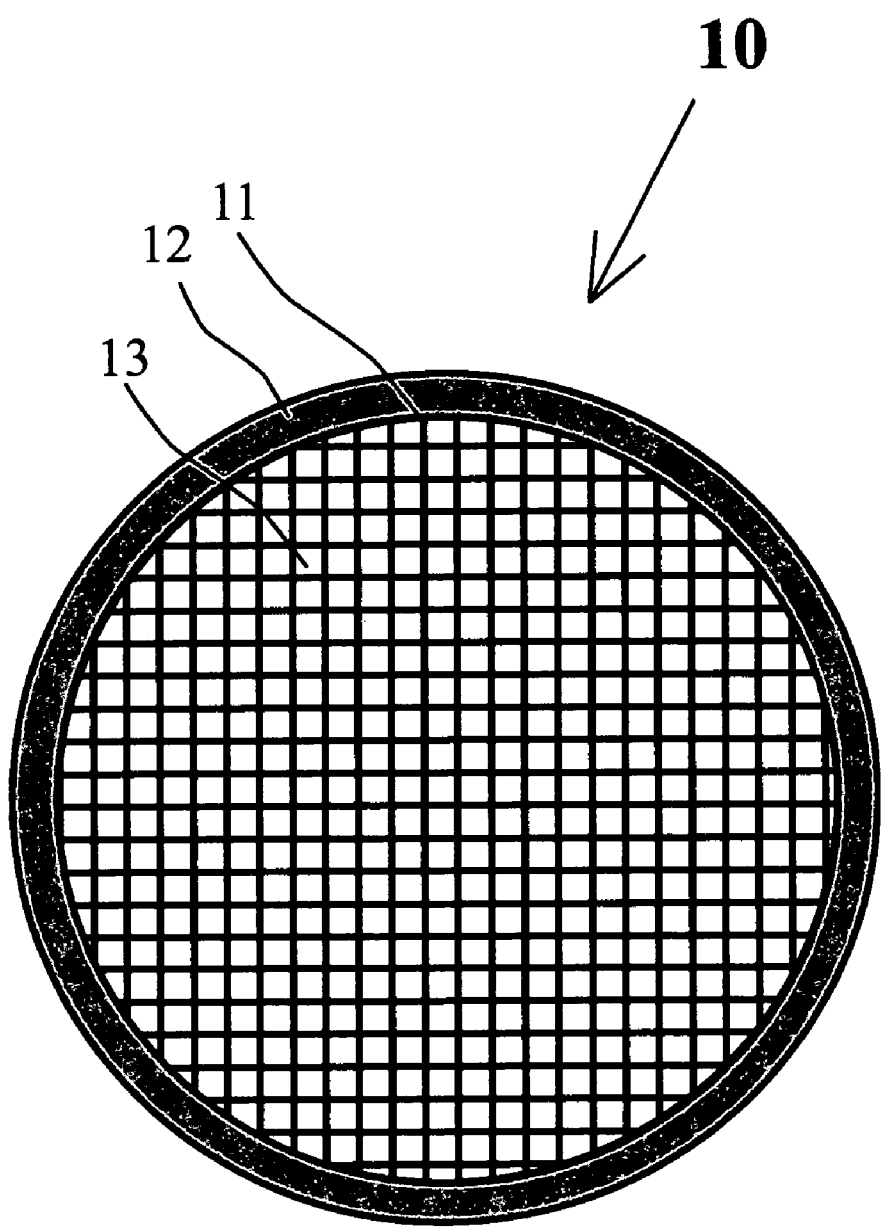
FIG. 1 is a schematic diagram showing a fragrant-scented ball comprising a porous compressible fragrance saturated substrate coated with a barrier layer.

This invention relates to an additive for litters used by cats and other animals. The additive releases an odor neutralizing, pleasant fragrance when the litter is used by a cat or animal. Generally stated, the additive is a fragrant-scented ball, which may be added to the litter or, alternatively, may be packaged with litter. The fragrant-scented ball includes a fragrance saturated open-celled porous compressible substrate, which is coated with a barrier layer that breaks under the weight of the cat or animal when a litter box is used. The term ball includes spherically shaped substrates, cylindrically shaped substrates or cube shaped substrates or other regular or irregularly shaped substrates. The barrier layer prevents the evaporation of the fragrance. It releases the fragrance only when the barrier coating is broken by the weight of a cat or other animal that uses the cat litter. The barrier coating also protects the fragrance saturated porous substrate from being saturated with cat or animal urine and excrements. The barrier layer includes soda ash, which is predominantly sodium carbonate, available for neutralizing any acidity present in the urine in the immediate vicinity and retards the development of odor. Preferably, the fragrant-scented ball additive is used in conjunction with a clumping litter, which reduces or minimizes the spreading of urine due to the clumping action. The clumping litter generally uses a mixture of swelling clay composition together with non-swelling clay composition as discussed in U.S. Pat. No. 5,975,019 to Goss, et al. or mixture of gypsum with clay as discussed in U.S. Pat. No. 4,459,368 to Jaffee, et al.

Generally stated, the invention involves the use of fragrant-scented balls, which have a fragrance saturated, open-celled, porous compressible substrate. Such substrate is completely covered with a barrier coating that prevents the evaporation of the fragrance saturated within the substrate. The barrier coating includes incorporation of soda ash which is predominantly sodium carbonate that neutralizes any urine acid in the immediate vicinity used by the animal in the litter box and retards the development of odor. The fragrance may be an odor neutralizing or masking compound or a pleasant smelling fragrance. A typical odor neutralizing or masking compound is lauryl methacrylate (sold under trade name METAZENE by Pestco Company). The masking compound is dissolved in acetone, a non-aqueous volatile carrier. Representative examples of fragrance components generally include, but are not limited to: volatile phenolic substances (such as iso-amyl salicylate, benzyl salicylate, and thyme oil red); essence oils (such as geranium oil, patchouli oil, and petitgrain oil); citrus oils; extracts and resins (such as benzoin siam resinold and opoponax resinold); "synthetic" oils such as Bergamot 37 and 430, Geranium 76 and Pomeransol 314, and Powder Mask CE-32907); aldehydes and ketones (such as beta-methyl naphthyl ketone, p-tert-butyl-a-methyl hydrocinnamic aldehyde and p-tert-amyl cyclohexanone); polycyclic compounds (such as Coumarin and beta-naphthyl methyl ether); esters (such as diethyl phthalate, phenylethyl phenylacetate). Fragrances also include esters and essential oils derived from floral materials and fruits, citrus oils, absolutes, aldehydes, etc. and alcohols (such as dimyrcetol, phenylethyl alcohol and tetrahydromuguol). Generally the fragrances are dissolved in aqueous or non-aqueous carrier and the fragrance soaked substrate is coated with a barrier layer, which prevents the evaporation of the carrier and the fragrance. Alternatively, the fragrance may be in the form of a solid powder wherein the vapor pressure of the fragrance is greater than one atmosphere thereby disseminating the fragrance when the barrier coating is broken.

The barrier layer has several key requirements. It must prevent the evaporation of the fragrance entrained within the open-celled porous substrate. This requirement is met by gypsum hemi-hydrate mixed with soda ash, which is predominately sodium carbonate in a ratio 70% to 30%. In this mixture ratio, the mechanical barrier properties of the barrier layer formed is retained and is effective in preventing the evaporation of the fragrance, while the sodium carbonate is made available upon breakage of the balls for neutralizing urine acidity and retarding odor development. When a polymeric barrier layer is used, the soda ash or sodium carbonate is first applied to the porous substrate, which is completely covered by the polymeric barrier layer. When this polymeric barrier layer breaks due to the weight of the animal, the sodium carbonate entrained therein is released to neutralize the urine acid and retard the odor development. When a liquid fragrance is used together with a carrier, the barrier should be resistant to the carrier, which may be aqueous or non-aqueous. Secondly, the barrier coating must be water insoluble and resist urine and cat or animal excrements from contaminating the fragrance saturated in the substrate. Thirdly, the barrier coating must be sufficiently thin that it breaks when a cat or other animal walks over the litter in the litter box. Since the substrate is porous and compressible, it provides very limited support to the barrier coating. Typically, the barrier coating is 75 to 250 microns thick, and the substrate has a linear dimension of 1000 microns to 5000 microns. The substrate is produced from open cell foam of polyurethane or rubber or other suitable polymeric material. Smaller diameter of substrate in combination with a thicker barrier coating provides fragrant-scented balls, which survive packaging when mixed in litter-bags and still break under load of a cat or animal in a litter box. Larger diameter substrates with thinner barrier coatings provide fragrant-scented balls suitable for individual packaging, which is added by the user to a litter box.

The barrier coating may be applied in one of several methods. In the first method, the barrier coating is a thermoplastic polymer layer. The thermoplastic polymer is dissolved in a solvent to form a thick syrupy liquid. The fragrance saturated, open-celled porous compressible substrate is dipped in the syrupy polymeric liquid and the solvent is evaporated to fashion the barrier coating over a soda ash or sodium carbonate coated porous substrate. One example of polymer dissolved in a solvent is polymethyl methacrylate (PMMA) dissolved in dichloromethane or other suitable solvent. This operation is carried out in a rotating drum or barrel so that the syrupy polymeric liquid coats each substrate and the solvent evaporates, keeping the barrier coated substrates apart from one another. In a second method, the fragrance saturated open-celled porous compressible substrate covered with soda ash or sodium carbonate is coated with a thermosetting resin and a cross-linking agent. This operation is also processed in a rotating drum or barrel wherein the resin and cross-linking agent are added sequentially. The product is removed after the barrier coating is formed. An example of a cross-linking coating system uses aromatic primary amine with acrtylamide polymer and formaldehyde. In a third barrier coating method, the fragrance saturated open-celled porous compressible substrate covered with soda ash or sodium carbonate is sprayed with or dipped in molten wax composition. This operation is also processed in a rotating drum or barrel. The hot molten wax coats the saturated substrate and freezes, forming a barrier coating. The rotation of the drum or barrel prevents the barrier-coated substrates from sticking to each other. In a fourth method, the fragrance-saturated, open-celled, porous compressible substrate is coated with a gypsum-soda ash, which is predominantly sodium carbonate in a 70-30 weight percent ratio water mixture. Gypsum is calcium sulfate hemihydrate, and chemically combines with water to set gypsum forming crystals of calcium sulfate dihydrate. The presence of 10-30 wt % soda ash or sodium carbonate does not affect the mechanical properties and integrity of the barrier coating. Again, this operation is carried out in a rotating drum or barrel.

The following examples are provided to more completely describe the properties of the present invention. The specific techniques, conditions, materials, proportions and reported data set forth to illustrate the principles and practice of the invention are exemplary only and should not be construed as limiting the scope of the invention.

EXAMPLE 1

Cellulose acetate open cell foam is cut to 1500 micron cubes and was saturated with Listerine mouth wash, the fragrance of which is easily recognized. A gypsum water mixture is constituted by thoroughly mixing 8 oz of water to one pound of gypsum. The Listerine saturated substrate is immersed in the gypsum water mix and is withdrawn, resulting in a uniform barrier coating. The barrier coating hardens within 20 minutes. The barrier-coated substrate is broken to release the saturated Listerine fragrance.

EXAMPLE 2

Cellulose acetate open cell foam is cut to 1500 micron cubes and is saturated with Listerine mouth wash, the fragrance of which is easily recognized. A 70 wt % gypsum-30 wt % soda ash water mixture is constituted by thoroughly mixing 8 oz of water to one pound of gypsum 0.43 pound of soda ash. The Listerine saturated substrate is immersed in the gypsum, soda ash, water mix and is withdrawn, resulting in a uniform barrier coating. The barrier coating hardens within 20 minutes. The barrier-coated substrate is broken to release the saturated Listerine fragrance.

EXAMPLE 3

Cellulose acetate open cell foam is cut to 1500 micron cubes and is saturated with Listerine mouth wash, the fragrance of which is easily recognized. Paraffin wax is melted in a metallic container. Upon being measured, the melting point is determined to be 55° C., and the melt is heated to 65° C. The Listerine saturated substrate is first dipped in a stiff mixture of 0.5 pound soda ash with 8 Oz of water and dried. The coated cellulose acetate foam is next dipped in hot wax melt and then withdrawn. The adherent wax melt layer solidifies within 3 minutes, forming the barrier coating. The barrier-coated substrate is broken to release the saturated Listerine fragrance.

FIG. 1 is a schematic diagram showing a fragrant-scented ball 10 having a central fragrance saturated porous compressible substrate 11 coated with a barrier layer 12. The central porous compressible substrate is open cell foam fabricated from polyurethane, or latex rubber or other suitable polymeric materials. The open cell pores 13 provide spaces within which the fragrance scent is incorporated. The fragrant scent may be carried in an aqueous or non-aqueous carrier or may be in the form of a powder dispersed within the open cell structure of the foam. The porous compressible substrate has a linear dimension in the range of 1000 to 5000 microns, and the barrier coating is in the range of 75 to 250 microns. The barrier layer is selected to prevent the evaporation of the fragrance saturated in the porous substrate. The barrier layer includes 80 to 70 weight percent gypsum and 20 to 30 percent soda ash in one embodiment. In a second embodiment, the barrier layer is a polymeric layer covering an initial coating of soda ash over the porous compressible substrate. The barrier layer breaks under load when a cat or animal uses a litter box containing fragrant-scented balls, and resists deterioration by urine and other animal excrement.

Figure 2:
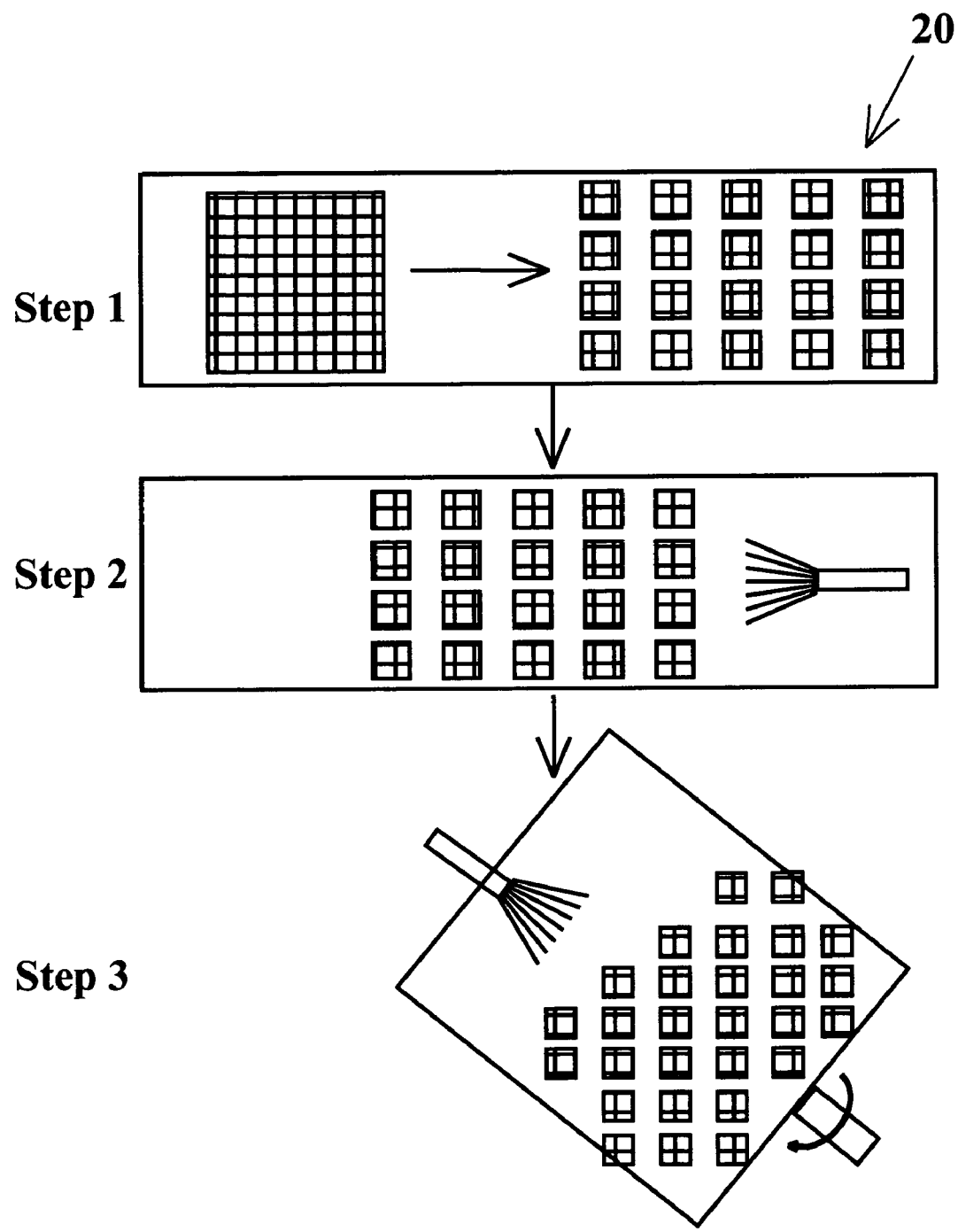
FIG. 2 is a diagrammatic representation of the process of manufacturing a fragrant-scented ball for use in a litter box as an additive.

Referring to FIG. 2, there is shown generally at 20 a diagrammatic representation of the process of manufacturing a fragrant-scented ball. In step 1, the porous compressible substrate is prepared. In step 2, the porous compressible substrate is saturated with a fragrant scent. This may be accomplished by a liquid immersion process (not shown) or use of a spray process, as shown, that soaks the porous compressible substrates. In step 3, the fragrance saturated porous compressible substrates are transferred to a rotating drum or barrel. The barrier coating is applied in the form of spray, as shown, or by other means in the rotating drum to coat each substrate with the barrier layer and keep individual substrates apart so that they do not stick to each other. The barrier coating may include for example an aqueous mixture of gypsum monohydrate in the range of 80 to 70 weight percent, soda ash in the range of 20 to 30 weight percent, which sets on the porous substrate. Alternatively, a soda ash coating may be applied as a dry powder over the porous substrate followed by a spray of a polymeric coating.

Significant advantages are realized by practice of the present invention. The key components of the breakable odor control additive for animal litter include, in combination, the features set forth below;

1. a breakable odor control additive for animal litter comprising a plurality of fragrant-scented balls;

2. each fragrant-scented ball having a central porous compressible substrate saturated with a fragrant scent and coated with a barrier layer;
3. the central fragrance-saturated, porous compressible substrate providing very limited support to the barrier layer;
4. the barrier layer braking under load of a cat or animal using a litter box containing the litter and fragrant-scented balls, triggering release of the fragrance;
5. the barrier layer substantially preventing evaporation of the saturated fragrance in the porous compressible substrate until broken;
6. the barrier layer containing or covering soda ash that is made available upon breaking of the barrier layer for neutralizing urine acid and retarding odor development;
7. the barrier layer substantially preventing the degradation of fragrance saturated in the porous compressible substrate due to urine and cat or animal excrements.

The process of manufacturing a fragrant-scented ball includes the steps set forth below:
1. selecting open-celled, foam material having appropriate shape, size and compressibility for substrates;
2. saturating porous compressible substrates with a liquid fragrance in a carrier or incorporating solid fragrance within open cells of the porous compressible substrate;
3. coating the fragrance-saturated, porous, compressible, open-cell substrate with a compound that hardens to form a barrier layer comprising soda ash;
4. packaging the fragrant-scented balls as an additive for litter or mixing them with a litter formulation that is packaged for sale.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. An odor control additive for litter, comprising:
   a. a plurality of fragrant-scented balls adapted to be added to litter;
   b. said fragrant-scented balls comprising a central, open-celled, porous compressible substrate and a barrier coating covering said substrate;
   c. said central, porous compressible substrate being saturated with a fragrance;
   d. said barrier coating comprising soda ash;
   e. said barrier coating being supported by said central porous compressible substrate;
   f. said barrier coating resisting fragrance degradation by urine and cat or animal excrements,
   whereby said fragrant-scented balls within said litter are operative to break under load in response to the weight of a cat or other animal using said litter box, thereby releasing fragrance saturated in the central porous compressible substrate and releasing soda ash for neutralizing urine acid and retarding odor development.

2. The odor control additive as recited by claim 1, wherein said barrier coating comprises a mixture of gypsum and soda ash.

3. The odor control additive as recited by claim 2, wherein said barrier coating has gypsum present in the range of 70 to 80 weight percent and soda ash is present in the range of 20 to 30 weight percent.

4. The odor control additive as recited by claim 1, wherein said barrier coating is a polymeric coating applied over a discrete coating of soda ash on said compressible substrate.

5. The odor control additive as recited by claim 4, wherein said polymeric coating is selected from a thermoplastic resin or a thermosetting resin.

6. The odor control additive as recited by claim 1, wherein said barrier coating is a wax composition applied over a discrete coating of soda ash on said compressible substrate.

7. The odor control additive as recited by claim 1, wherein said central open-celled porous compressible substrate is a polyurethane open-cell foam.

8. The odor control additive as recited by claim 1, wherein said central open-celled porous compressible substrate is a latex rubber open-cell foam.

9. The odor control additive as recited by claim 1, wherein said fragrance is an odor controlling or odor masking compound.

10. The odor control additive as recited by claim 9, wherein said odor controlling or odor masking compound is lauryl methacrylate.

11. The odor control additive as recited by claim 1, wherein said fragrance is a natural plant-base fragrance.

12. The odor control additive as recited by claim 1, wherein said fragrance is a synthetic fragrance replicating a natural fragrance.

13. The odor control additive as recited by claim 1, wherein said central open-celled porous compressible substrate has a linear dimension of about 1000 to 5000 microns.

14. The odor control additive as recited by claim 1, wherein said barrier coating has a thickness of about 75 to 250 microns.

15. A process for manufacturing an odor control additive for a litter formulation, comprising the steps of;
   a. selecting open-celled foam material having appropriate shape, size and compressibility for substrates;
   b. saturating porous compressible substrates with a liquid fragrance in a carrier disposed within open cells of the porous compressible substrate;
   c. coating the fragrance saturated porous compressible open-cell substrate with a barrier coating comprising soda ash; and
   d. adding said fragrant-scented balls to said litter formulation.

16. A process for manufacturing an odor control additive as recited in claim 15 wherein the barrier coating comprises gypsum and soda as in the range from 80:20 to 70:30.

17. A process for manufacturing an odor control additive as recited in claim 15 wherein the barrier coating comprises a first coating of said substrates with soda ash followed by a polymeric coating of thermoplastic or thermosetting polymer.

18. A process for manufacturing an odor control additive as recited in claim 15 wherein the barrier coating comprises a first coating of said substrates with soda ash followed by a wax composition coating.

19. A process for manufacturing an odor control additive for a litter formulation, comprising the steps of;
   a. selecting open-celled foam material of appropriate shape, size and compressibility for substrates;
   b. saturating porous compressible substrates with a fragrance to incorporate said fragrance within open cells of the porous compressible substrate;
   c. coating the fragrance saturated porous compressible open cell substrate with a barrier coating comprising soda ash;
   d. packaging the fragrant-scented balls as an additive for said litter formulation.

20. A process for manufacturing an odor control additive as recited in claim 19 wherein the barrier coating comprises gypsum and soda ash present in an amount ranging from 80:20 to 70:30.

21. A process for manufacturing an odor control additive as recited in claim 19 wherein the barrier coating comprises a first coating of said substrates with soda ash, followed by a polymeric coating of thermoplastic or thermosetting polymer.

22. A process for manufacturing an odor control additive as recited in claim 19 wherein the barrier coating comprises a first coating of said substrates with soda ash, followed by a wax composition coating.

* * * * *